Nov. 5, 1940.  J. S. LITTLE ET AL  2,220,574
APPARATUS FOR CLARIFYING LIQUID
Filed March 31, 1937
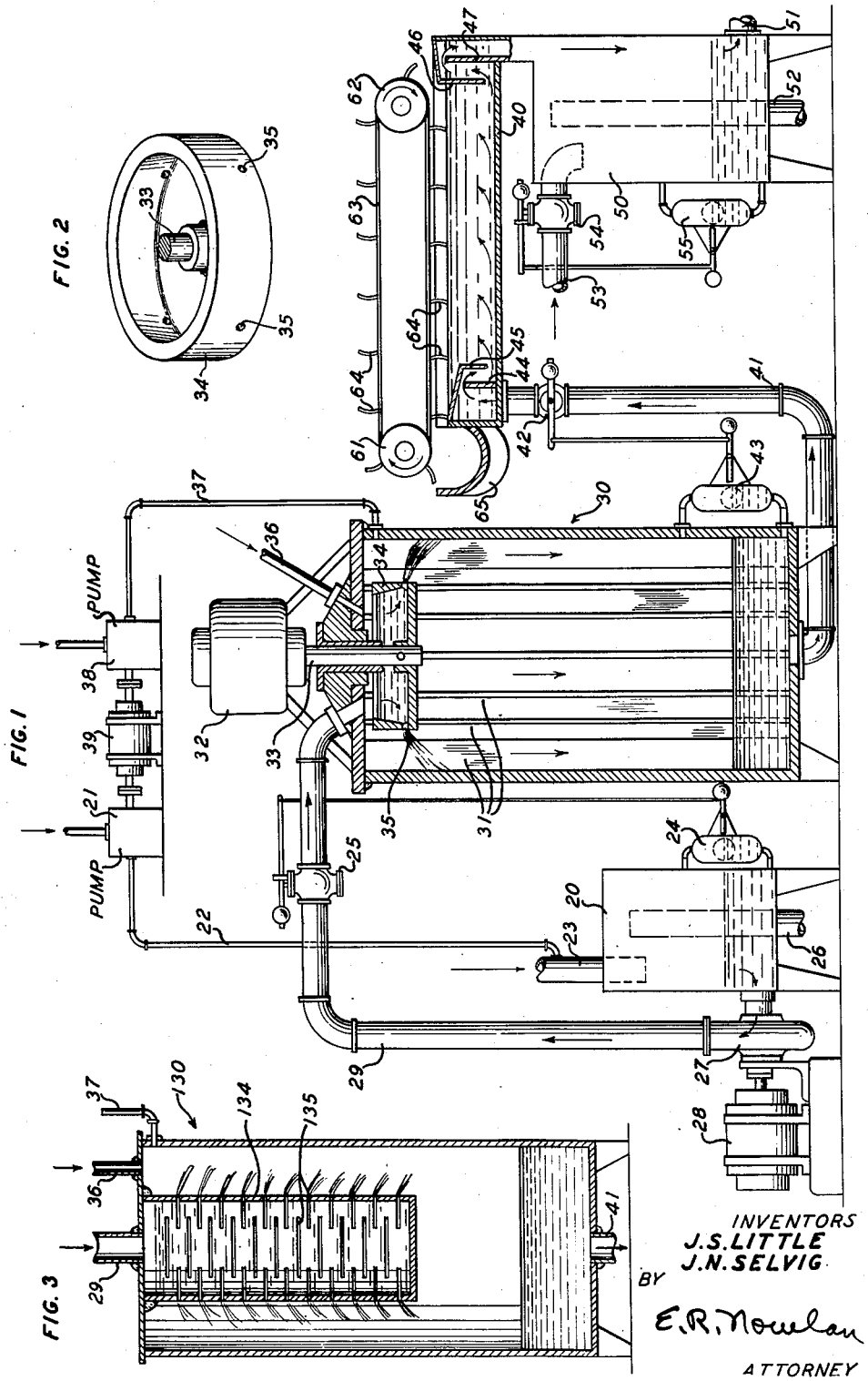
INVENTORS
J.S. LITTLE
J.N. SELVIG
BY
E.R. Nowlan
ATTORNEY Patented Nov. 5, 1940

2,220,574

UNITED STATES PATENT OFFICE 2,220,574

APPARATUS FOR CLARIFYING LIQUID

John S. Little and John N. Selvig, Westfield, N. J., assignors to Western Electric Company, Incorporated, New York, N. Y., a corporation of New York Application March 31, 1937, Serial No. 133,974

3 Claims. (Cl. 210—53)

This invention relates to apparatus for clarifying liquid and more particularly to apparatus for reclaiming water used in paper pulp machines to separate comminuted fibrous material suspended in the water therefrom.

In some kinds of apparatus for handling paper pulp, the fibrous material is suspended in a relatively large amount of water to be deposited therefrom in various forms and ways, e. g. in broad sheets of interfelted fibres to make paper, in narrow ribbons to be applied to and formed over metal wires to make insulated electrical conductors, and in other modes. The waste water from such operations, commonly known as "white water" contains a proportion of broken fibres, fibre dust and such like comminuted material, which, in some cases, may prevent satisfactory reuse of the water in the manufacturing process or may render the white water an objectionable or illegal waste effluent to be run off into a sewer or other drainage channel. In other instances the suspended solid material may have value to render it desirable that this material be recovered.

An object of the present invention is to provide an apparatus for rapidly, simply and reliably separating from turbid liquid a major portion of its burden of suspended, comminuted solid material and so to render the liquid reusable in manufacture or innocuous as an effluent waste or to recover valuable suspended solids.

With such an object in view one embodiment of the invention contemplates an apparatus for practising the method which comprises means for bringing white water or analogous liquids into contact with compressed air or other suitable gas under pressure while causing the liquid to present a large area relative to its volume to the high pressure air or gas, and then subjecting the gas charged liquid to reduced pressure whereby the gas is released from solution in numerous small bubbles dispersed throughout the body of the liquid and rises carrying the finely divided solid material into a froth or scum on the surface, leaving the liquid separated from the bulk of the suspended solids.

Other objects and features of the invention will appear from the following detailed description of one embodiment thereof taken in connection with the accompanying drawing in which the same reference numerals are applied to identical parts in the several figures and in which Fig. 1 is a diagrammatic representation of apparatus constructed in accordance with the invention;

Fig. 2 is a detached view in perspective of the water dispersing element thereof; and Fig. 3 is a view of a modified form of the water charging tank shown in Fig. 1.

In the apparatus herein disclosed in Figs. 1 and 2, a receiving tank 20 is provided into which white water, or analogous liquid bearing suspended finely divided solids, is delivered through a pipe 23 from some source not shown, such as a paper machine for example. As the liquid is delivered through the pipe 23, a solution or dispersion in liquid of some suitable frothing agent is mixed with the liquid. This frothing agent may preferably be delivered in suitably predetermined volume through a pipe 22 by a suitable pump 21 from some appropriate source or storage means not shown.

In the case of white water, in one instance, a solution or dispersion of casein material in water was found to be of value in promoting the desired result. However, in some liquids there may be already present a sufficient proportion of size or the like to render additional material of this nature unnecessary. In the case just referred to, the material added by the pump 21 was made up by mixing a commercial casein glue containing roughly equal parts of casein and lime with sufficient water to make a preparation which would pass satisfactorily through the pump 21. This was delivered by the pump at a rate to supply about 1¼ oz. of the dry casein-lime material for every 1000 gallons of white water passing through the tank 20.

The tank 20 may be open to atmospheric pressure and is provided with any suitable familiar type of maximum and minimum level control device 24 which operates a valve 25 hereinafter described. The tank 20 may also have a safety overflow pipe 26 connected to a sewer or other waste channel.

White water from the receiving tank 20 is drawn off by a pump 27 driven by a motor 28 and pumped through a pipe 29 into a charging tank generally indicated at 30. The valve 25 is in the pipe 29 and is operated by the device 24 to prevent the level in the tank 20 from falling sufficiently to uncover the intake of the pump 27.

The tank 30, as shown, is a vertical, closed and air tight cylinder although it may have any other form suitable for its function as described. Spaced around the cylindrical inner surface of the side walls, are a plurality of inwardly extending radial fins or baffles 31, preferably extending from the bottom to near the top of the tank. A motor 32 is positioned above the tank and drives a shaft 33 extending axially down through the top wall of the tank. A spray head 34 is secured to the shaft 33 to be driven thereby and is located just below the tank top. As shown, this spray head 34 is an open topped, shallow, closed bottom vessel with a side wall which is cylindrical externally and tumble-home or frusto-conodial internally, the top inner edge being of less diameter than the junction of the side wall and bottom. Near the bottom is a plurality of spray holes 35, radial bores through the side walls.

Compressed air or other suitable charging gas is delivered into the tank 30 through a pipe 36 from a source or storage means not shown; and, if desired, a coagulating or other agent (e. g. a solution of alum) may also be delivered into the tank in predetermined volume through a pipe 37 by a pump 38 from a source or storage not shown. The two pumps 21 and 38 may be conveniently driven by a common motor 39. In one instance the alum solution was of a concentration and was delivered by the pump 38 at a rate to provide about ⅝ oz. of dry "papermaker's alum," i. e. aluminum sulphate, per 1000 gallons of white water.

The charged white water or other liquid passes from the charging tank 30 to a flotation tank 40 through a discharge pipe 41 in which is a valve 42 governed by a liquid level device 43 connected to the tank 30 to prevent uncovering of the opening of the discharge pipe 41 into the tank 30.

The flotation tank 40, as shown, is a rectangular, flat, relatively shallow trough open to the atmosphere at the top. The charged liquid from the tank 30 enters the tank 40 behind a pair of baffles 44 and 45 at one end of the tank, adapted to suppress turbulence, and to compel the liquid to flow quietly out from under the baffle 45 into the body of the tank 40. At the other or outflow end of the tank, the purified effluent passes a pair of baffles 46 and 47, adapted to prevent eddies from the outflow from disturbing the main body of liquid in the tank. The baffles 44, 45 and 46, 47 also compel the liquid to enter and to leave the tank near the bottom thereof, thus further obviating disturbance of the main body of liquid at its surface.

The effluent from the tank 40 is delivered directly into a storage tank 50 from which it may be passed on via a pipe 51 to be returned for reuse or to be wasted. This tank 50 may also, preferably, be provided with a safety overflow 52, and with a fresh water supply line 53, connected to a source not shown and controlled by a valve 54 operated by a liquid level control device 55 connected to the tank 50.

Above the tank 40 is positioned a pair of spaced parallel rollers 61 and 62 around which runs a belt or chain 63 which is located parallel to and a little above the level of the liquid in the tank 40 as determined by the baffle 47. On the outside of the belt is positioned a plurality of transverse, spaced fins or scrapers 64 which, when passing with the belt from the under side of one roller to the under side of the other, extend down to approximately the normal level of the liquid in the tank 40. One or other or both the rollers 61 and 62 will be driven by any suitable means not shown.

In operation, the several pumps, particularly the pump 28, are run at such speed as will cause the water in the tank 40 to take from 60 to 90 seconds to pass from the baffle 45 to the baffle 46. The white water entering the tank 30 has been thoroughly mixed with the foaming agent (injected by the pump 21) by the action of the pump 28 and is received in the spray head 34. This latter in one case was rotated preferably at about 1800 R. P. M. and had a diameter of about four inches. The white water is driven out of the spray head through the holes 35 in fine streams or jets and at considerable velocity, dashing against the baffles 31. A portion of the liquid is thus converted into spray or mist and settles down through the chamber while the remainder runs down the surfaces of the baffles and the chamber wall in a thin film.

Compressed air or other suitable gas is led into the chamber through the pipe 36, preferably under a pressure of the order of 30 lbs. per square inch. Thus the liquid in a finely divided form with great surface exposure takes up and dissolves a considerable amount of the air. This charged liquid then accumulates in the lower part of the tank and is transferred by the gas pressure above it through the pipe 41 to the tank 40.

In the tank 40 the liquid is released from the pressure, and its content of dissolved air or gas comes out of solution in the form of a great number of tiny bubbles dispersed throughout the body of the liquid. Presumably the fragments of fibrous material suspended in the white water afford points of aggregation for the released gas. In any event the bubbles are formed to be attached or adherent to the suspended solid material; and as the bubbles float up through the liquid, they bring with them most of the solids and form a scum or froth therewith which floats on the surface. This scum or froth is removed from the surface of the liquid in the tank 40 by the fins or scrapers 64, which deliver it into a trough 65, whence it may be removed and disposed of. The liquid remaining flows off under the baffle 46 and over the baffle 47 into the storage tank, whence it may be returned for reuse or wasted via the pipe 51.

In the instance referred to at various times above, the white water entering the tank 20 carried about 100 to 150 parts per million of suspended solids, while the effluent from the tank 40 carried about 3 to 5 parts per million suspended solid matter.

In Fig. 3 is disclosed an alternative arrangement for a charging tank 130 which may be used in place of the tank 30, and which has no moving parts. Here the pipe 29 leads down through the center of the top of the tank into a receptacle 134. This latter is a cylindrical walled chamber with a closed bottom, located coaxially in the tank 130 and secured to the under side of the top of the tank 130, as by welding. A plurality of narrow horizontal slots 135 in the side walls of the receptacle 134 allow the liquid to be sprayed out into the chamber 130 in spray or in thin sheets, to effect rapid charging of the liquid.

Other modifications of and departures from the illustrative disclosure above may be made without departing from the spirit and scope of the invention as pointed out in and limited only by the appended claims.

What is claimed is:

1. In an apparatus for clarifying a liquid and having means to treat the liquid with gas at more than atmospheric pressure, an open topped tank to receive gas charged liquid from the said means and having a liquid inlet aperture near the bottom of the tank, a baffle extending upwardly from the bottom of the tank near a portion of the wall of the tank with the inlet aperture between the baffle and the nearby wall portion, and a second baffle extending out from the nearby wall portion beyond and above the first named baffle and then downwardly parallel to and spaced from the first named baffle.

2. In an apparatus for clarifying a liquid and having means to treat the liquid with gas at more than atmospheric pressure, an open topped tank to receive gas charged liquid from the said means and having a liquid outlet aperture near the bottom of the tank, a baffle extending upwardly from the bottom of the tank near a portion of the wall of the tank with the outlet aperture between the baffle and the nearby wall portion, and a second baffle extending out from the nearby wall portion beyond and above the first named baffle and then downwardly parallel to and spaced from the first named baffle.

3. In an apparatus for clarifying a liquid and having means to treat the liquid with gas at more than atmospheric pressure, an open topped tank to receive gas charged liquid from the said means and having liquid inlet and outlet apertures near the bottom of the tank at opposite ends thereof, a baffle extending upwardly from the bottom of the tank near a portion of the wall of the tank with the inlet aperture between the baffle and the nearby wall portion, a second baffle extending out from the nearby wall portion beyond and above the first named baffle and then downwardly parallel to and spaced from the first named baffle, and another pair of baffles similarly formed and related to each other and to the outlet aperture.

JOHN S. LITTLE.
JOHN N. SELVIG.